(12) United States Patent
Midorikawa et al.

(10) Patent No.: US 11,827,818 B2
(45) Date of Patent: Nov. 28, 2023

(54) PHOTOCURABLE COMPOSITION AND PRODUCT

(71) Applicant: CEMEDINE CO., LTD., Tokyo (JP)

(72) Inventors: Tomohiro Midorikawa, Tokyo (JP); Hiroshi Yamaga, Tokyo (JP)

(73) Assignee: CEMEDINE CO., LTD., Tokyo (JP)

( * ) Notice: Subject to any disclaimer, the term of this patent is extended or adjusted under 35 U.S.C. 154(b) by 0 days.

(21) Appl. No.: 17/675,595

(22) Filed: Feb. 18, 2022

(65) Prior Publication Data

US 2022/0177731 A1 Jun. 9, 2022

Related U.S. Application Data

(63) Continuation of application No. 16/070,638, filed as application No. PCT/JP2017/002180 on Jan. 23, 2017, now abandoned.

(30) Foreign Application Priority Data

Jan. 22, 2016 (JP) ................ 2016-010824

(51) Int. Cl.
 C08F 2/46 (2006.01)
 C08F 2/50 (2006.01)
 C08G 61/04 (2006.01)
 C09J 4/00 (2006.01)

(52) U.S. Cl.
 CPC ...................... C09J 4/00 (2013.01)

(58) Field of Classification Search
 CPC .............. C09J 4/00; C08F 220/1811
 USPC ............ 522/26, 7, 6, 189, 184, 71, 1; 520/1
 See application file for complete search history.

(56) References Cited

U.S. PATENT DOCUMENTS

| 2009/0173438 | A1 | 7/2009 | Takeuchi | |
| 2014/0124134 | A1* | 5/2014 | Konarski | C09J 133/14 |
| | | | | 522/24 |

FOREIGN PATENT DOCUMENTS

| CN | 101547866 A | 9/2009 | |
| CN | 103502373 A | 1/2014 | |
| EP | 0535828 A1 | 4/1993 | |
| EP | 2093195 A1 | 8/2009 | |
| JP | S63-243009 A | 10/1988 | |
| JP | H03-81381 A | 4/1991 | |
| JP | H5-86149 A | 4/1993 | |
| JP | 05-125330 A | 5/1993 | |
| JP | 05125330 | * 5/1993 | |
| JP | H05-125330 A | 5/1993 | |
| JP | H5-170807 A | 7/1993 | |
| JP | 2003-313206 A | 11/2003 | |
| JP | 2009-120686 A | 6/2009 | |
| JP | 2011-184402 A | 9/2011 | |
| JP | 2015-030752 A | 2/2015 | |
| JP | 2015-172742 A | 10/2015 | |
| JP | 2015-174929 A1 | 10/2015 | |
| JP | 2015-183139 A | 10/2015 | |
| JP | 2015172742 | * 10/2015 | |
| WO | 2011/138287 A1 | 11/2011 | |
| WO | WO-2011138287 A1 | * 11/2011 | ............ C08F 265/06 |

OTHER PUBLICATIONS

Takahashi et al, JP 05-125330 Machine Translation, May 21, 1993 (Year: 1993).*
Nagai et al, JP 2015-172742 Machine Translation, Oct. 1, 2015 (Year: 2015).*
International Search Report for International Application No. PCT/JP2017/002180 dated Feb. 21, 2017 (2 Sheets).
Supplementary European Search Report for European Patent Application No. 17741581.7 dated Aug. 16, 2019 (13 sheets).
Office Action of corresponding Chinese Patent Application No. 201780007538.7 dated Apr. 24, 2020 (10 sheets).
Office Action pursuant to Article 94(3) EPC of European Application No. 20171808.7 dated Sep. 26, 2022 (4 sheets).
Office Action of corresponding Chinese Patent Application No. 201780007538.7 dated Jul. 15, 2021 (13 sheets).
Office Action of corresponding Japanese Patent Application No. 2017-562941 dated Dec. 14, 2020 (8 sheets).

* cited by examiner

*Primary Examiner* — Jessica Whiteley
(74) *Attorney, Agent, or Firm* — Kratz, Quintos & Hanson, LLP

(57) ABSTRACT

A photocurable composition which has excellent storage stability and is cured rapidly in bonding an opaque material, and a product. The photocurable composition contains (A) a compound having an unsaturated double bond, (B) at least one compound selected from the group consisting of compounds represented by the general formulae (1), (2), and (3), and (C) a sensitizer. In the general formulae (1), (2), and (3), $R^1$ to $R^3$ are each independently a substituent containing at least one group selected from the group consisting of a nitro group, a cyano group, a hydroxy group, an acetyl group, a carbonyl group, a substituted or unsubstituted allyl group, a substituted or unsubstituted alkyl group, a substituted or unsubstituted alkoxy group, an unsubstituted or substituted aryl group, an unsubstituted or substituted aryloxy group, a heterocyclic ring structure-containing group, and a group having a plurality of rings.

4 Claims, No Drawings

PHOTOCURABLE COMPOSITION AND PRODUCT

TECHNICAL FIELD

The present invention relates to a photocurable composition and a product. In particular, the present invention relates to a photocurable composition which is usable in bonding an opaque material and has excellent storage stability, and a product.

BACKGROUND ART

There are various adhesive agents. A thermosetting adhesive agent and a two-part mixing adhesive agent are known. The thermosetting adhesive agent is restricted to use in a part which is not resistant to heat treatment. For the two-part mixing adhesive agent, weighing and processing for mixing are complex.

As a one-part normal temperature-curable resin which does not require heat treatment and mixing treatment, an ultraviolet curable resin is known. Further, a photocurable resin which is polymerized and cured immediately by irradiation with light such as ultraviolet light is known. The photocurable resin is rapidly cured and is a one-part resin. Thus, mixing processing is not required, and the photocurable resin has favorable handling property and favorable storage stability. For this reason, the photocurable resin may be used in various scenes such as coating a surface and potting. In the photocurable resin, a principle is generally used in which an active radical and the like are generated by light irradiation and a radically polymerizable monomer or oligomer is polymerized. Therefore, when light irradiation is stopped, the generation of active radical is stopped, and the polymerization reaction of the polymerizable monomer or oligomer is also stopped. A portion where light does not reach, such as a shade portion and a slit portion, does not cure. Accordingly, it is necessary that an adherend be transparent in bonding such as a case where adherends are bonded to each other and, that an adhesive composition be directly irradiated with active energy such as ultraviolet light.

On the other hand, as a one-part normal temperature-curable resin, an anaerobic curable composition is known, in the anaerobic curable composition, curing reaction in adhesion of the adherends proceeds due to blocking of oxygen. The anaerobic curable composition contains a (meth)acrylate ester monomer as a main component, and has properties that the anaerobic curable composition does not gel for a long period of time under contact with air or oxygen (hereinafter, simply referred to as "air") to stably maintain a liquid state and that the composition rapidly cures upon blocking or elimination of air. Due to such properties, the anaerobic curable composition is used in bonding and fixing a screw and a bolt, fixing a mating part, bonding flange faces, sealing, filling a hole formed in a casting part, and the like.

Patent Document 1 discloses (A) a compound having a polymerizable unsaturated double bond, (B) an organic peroxide, and (C) o-benzoic sulfimide, which are composition of a general anaerobic curable composition, and further describes an anaerobic curable composition further containing (D) a carbon powder.

CITATION LIST

Patent Literature

Patent Document 1: JP 2003-313206 A

SUMMARY OF INVENTION

Technical Problem

However, the anaerobic curable composition described in Patent Document 1 has problems such as low storage stability, a significant increase in viscosity, and progress of gelation during storage.

Therefore, an object of the present invention is to provide a photocurable composition which has excellent storage stability and is cured rapidly in bonding an opaque material, and a product.

Solution to Problem

To achieve the object, the present invention provides a photocurable composition containing (A) a compound having an unsaturated double bond, (B) at least one compound selected from the group consisting of compounds represented by the general formulae (1), (2), and (3) below, and (C) a sensitizer.

[Chemical Formula 1]

(1)

[Chemical Formula 2]

(2)

[Chemical Formula 3]

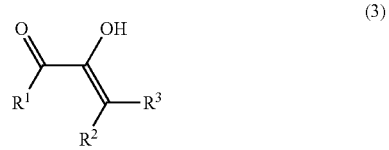

(3)

In the general formulae (1), (2), and (3), $R^1$ to $R^3$ are each independently a substituent containing at least one group selected from the group consisting of a nitro group, a cyano group, a hydroxy group, an acetyl group, a carbonyl group, a substituted or unsubstituted allyl group, a substituted or unsubstituted alkyl group, a substituted or unsubstituted alkoxy group, an unsubstituted or substituted aryl group, an unsubstituted or substituted aryloxy group, a heterocyclic ring structure-containing group, and a group having a plurality of rings. At least two groups selected from the group consisting of $R^1$ to $R^3$ may be bonded to each other to form a cyclic structure with carbon atoms to which the groups are bonded.

In the photocurable composition, it is preferable that the sensitizer (C) be at least one compound selected from the group consisting of a derivative of an aromatic compound, a carbazole derivative, an aromatic carbonyl compound, a benzophenone derivative, a thioxanthone derivative, and a coumarin derivative.

In the photocurable composition, the compound (B) is the compound represented by the general formula (1). The photocurable composition may further contain (D) at least one compound selected from the group consisting of a metal salt and a metal complex.

The photocurable composition can maintain a state, in which the photocurable composition is capable of adhesion to an adherend at least immediately after irradiation with active energy.

To achieve the object, the present invention provides a product containing a cured product obtained by curing any one of the photocurable compositions described above.

Advantageous Effects of Invention

According to the present invention, a photocurable composition which has excellent storage stability and is cured rapidly in bonding an opaque material, and a product can be provided.

DESCRIPTION OF EMBODIMENTS

Summary of Photocurable Composition

The photocurable composition according to an embodiment of the present invention is a photocurable composition which maintains a state, in which the photocurable composition is capable of adhesion to an adherend, after irradiation with an active energy ray and is cured under an anaerobic condition. Herein, the "state in which the photocurable composition is capable of adhesion" means a state where at least one portion of the photocurable composition is in a liquid or adhesive state until it is exposed to the anaerobic condition. The photocurable composition according to an embodiment of the present invention can be used in bonding opaque materials, and has excellent storage stability. A known photocurable composition is cured immediately after light irradiation. Therefore, not only the adherend is required to include a material which transmits light, but also the known photocurable composition applied to the adherend is required to be irradiated with light in its entirety. A known anaerobic adhesive composition contains a peroxide as a component, and thus the known anaerobic adhesive composition has low stability in a high-temperature environment and may be cured in a container. The present inventor has investigated a photocurable composition which maintains a state, in which the photocurable composition is capable of adhesion to an adherend, immediately after light irradiation, but before being placed under an anaerobic condition and also has excellent storage stability. As a result, the present inventor has found that the photocurable composition which maintains a state, in which the photocurable composition is capable of adhesion to an adherend after light irradiation and has excellent storage stability is obtained by a specific combination of a specific compound (a component B in the present invention) and a sensitizer (a component C in the present invention). Thus, the present invention has been completed. Hereinafter, the present invention will be described in detail by using embodiments.

Detail of Photocurable Composition

The photocurable composition according to an embodiment of the present invention contains (A) a compound having an unsaturated double bond, (B) at least one compound selected from the group consisting of compounds represented by the general formulae (1), (2), and (3) below, and (C) a sensitizer. Further, the photocurable composition according to an embodiment of the present invention may contain (D) at least one compound selected from the group consisting of a metal salt and a metal complex.

[Chemical Formula 4]

(1)

[Chemical Formula 5]

(2)

[Chemical Formula 6]

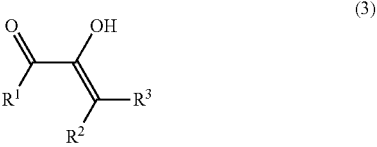

(3)

In the general formulae (1), (2), and (3), $R^1$ to $R^3$ are each independently a substituent. Examples of the substituent include a nitro group, a cyano group, a hydroxy group, an acetyl group, a carbonyl group, a substituted or unsubstituted allyl group, a substituted or unsubstituted alkyl group (preferably an alkyl group having from 1 to 5 carbons), a substituted or unsubstituted alkoxy group (preferably an alkoxy group having from 1 to 5 carbons), an unsubstituted or substituted aryl group, an unsubstituted or substituted aryloxy group, a heterocyclic ring structure-containing group, a group having a plurality of rings, and a combination thereof. Any of $R^1$ to $R^3$ may be bonded to each other to form a cyclic structure. When at least two groups selected from the group consisting of $R^1$ to $R^3$ are bonded to each other to form a cyclic structure, the cyclic structure may be a structure in which a plurality of benzene rings are condensed, or a structure in which a benzene ring and a heterocyclic ring, a non-aromatic ring, or a ring having a functional group such as a carbonyl group are condensed. Among the substituents, a substituted or unsubstituted alkyl or aryl group having from 1 to 5 carbons is preferable.

Compound Having Unsaturated Double Bond (A)

Various kinds of monomer, oligomer, and/or polymer can be used for the compound having an unsaturated double bond (A) as long as the compound has an unsaturated double bond in the structure. Specific examples of the compound having an unsaturated double bond (A) include monomers, oligomers, and polymers which contain at least one or more radically polymerizable functional groups (e.g., vinyl groups) in the molecule.

Examples of the monomer containing at least one or more radically polymerizable functional groups in the molecule include monoesters such as methyl (meth)acrylate, ethyl (meth)acrylate, butyl (meth)acrylate, 2-ethylhexyl (meth)acrylate, phenyl (meth)acrylate, benzyl (meth)acrylate, and isobornyl (meth)acrylate; hydroxyalkyl esters such as 2-hydroxyethyl (meth)acrylate, 2-hydroxypropyl (meth)acrylate, and 4-hydroxybutyl (meth)acrylate; and polyvalent esters such as ethyleneglycol diacrylate, polyethyleneglycol di(meth)acrylate, neopentylglycol di(meth)acrylate, trimethylolpropane tri(meth)acrylate, and pentaerythritol tetraacrylate. The monomers may be used alone or two or more types thereof may be used in combination.

Examples of the oligomer containing at least one or more radically polymerizable functional groups in the molecule include a curable resin having a malate group, a fumarate group, an allyl group, or a (meth)acrylate group, an isocyanate-modified acrylic oligomer, an epoxy-modified acrylic oligomer, a polyester acrylic oligomer, and a polyether acrylic oligomer. The oligomers may be used alone or two or more types thereof may be used in combination. For adjustment of viscosity of the photocurable composition according to an embodiment of the present invention or adjustment of properties of the photocurable composition to predetermined properties, the oligomers may be contained.

Examples of the polymer containing at least one or more radically polymerizable functional groups in the molecule include unsaturated polymerizable polymers such as an unsaturated polyester resin and an unsaturated acrylic resin, it is preferable that the unsaturated polymerizable polymer be used in combination with the monomer containing at least one or more radically polymerizable functional groups in the molecule.

Component (B)

Examples of the component (B) include at least one compound selected from the group consisting of compounds represented by the aforementioned general formulae (1), (2), and (3). The component (B) may be used alone or two or more types thereof may be used in combination. Examples of the component (B) include diphenylethanedione, 1,7,7-trimethylbicyclo[2.2.1]heptane-2,3-diene, 2,3-butanedione, 3-methyl-2-hydroxy-2-cyclopenten-1-one, and ascorbyl palmitate. In particular, the compound represented by the general formula (1) can be preferably used from the viewpoint of excellent storage stability. Of the compounds represented by the general formula (1), diphenylethanedione is preferably used.

Sensitizer (C)

As the sensitizer (C), various singlet sensitizers and/or triplet sensitizers can be used. Specific examples of the sensitizer (C) include derivatives of aromatic compounds, such as naphthalene, anthracene, and pyrene, carbazole derivatives, aromatic carbonyl compounds, benzophenone derivatives, thioxanthone derivatives, and coumarin derivatives. The singlet sensitizer is preferably a naphthalene derivative, an anthracene derivative, or a carbazole derivative. The triplet sensitizer is preferably a thioxanthone derivative or a benzophenone derivative. In an embodiment of the present invention, a thioxanthone derivative is more preferable.

As the sensitizer (C), for example, 2,4-diethylthioxanthone or benzophenone can be used. The amount of the sensitizer (C) to be added is from 0.01 to 10 parts by weight, and preferably from 0.1 to 5 parts by weight, per 100 parts by weight of the component (A). From the viewpoint of securing the absorption efficiency of light applied to the photocurable composition, the amount of the sensitizer (C) is preferably not less than 0.01 parts by weight. From the viewpoint of applying light to the photocurable composition in its entirety, the amount of the sensitizer (C) is preferably not greater than 10 parts by weight.

As the sensitizer (C), a compound having an absorption wavelength corresponding to the wavelength of light applied to the photocurable composition according to an embodiment of the present invention is preferably used. That is, the sensitizer (C) can be selected according to the wavelength of light applied to the photocurable composition.

Herein, in the photocurable composition according to an embodiment of the present invention, the specific components (B) and (C) are preferably used in combination. The present inventor has investigated combinations of various compounds, and found that, in a case where the components (B) and (C) according to an embodiment of the present invention in combination are used, there is a time lag between curing reactions of these components. Details of this mechanism are not clear, but it is considered that in a case of using the specific components (B) and (C) in combination, the lifetime of radical generated from the component (B) is relatively increased, and/or the generation of radical from the component (B) lags behind light irradiation by a predetermined time relative to the time of the photoirradiation. This suggests that the photocurable composition according to an embodiment of the present invention can maintain a state, in which the photocurable composition is capable of adhesion to an adherend after light irradiation until it is under an anaerobic environment.

Curing Accelerator

The photocurable composition according to an embodiment of the present invention may further contain a curing accelerator. As the curing accelerator, various curing accelerators may be used. For example, as the curing accelerator, o-benzoic sulfimide (saccharin) may be used. The amount of the curing accelerator to be added is from 0.1 to 10 parts by weight, and preferably from 0.1 to 5 parts by weight, per 100 parts by weight of the component (A).

Other Additive

To the photocurable composition according to an embodiment of the present invention, (D) at least one compound selected from the group consisting of a meal salt and a metal complex, an organic peroxide, a polymerization accelerator, a photoinitiator, a thickener, a filler, a plasticizer, a colorant, an extender, a moisture absorbent, a curing catalyst, a physical properties-adjusting agent for improving tensile properties or the like, a reinforcer, a flame retarder, an anti-sagging agent, an antioxidant, an anti-aging agent, an ultraviolet absorber, a solvent, a perfume, a pigment, a dye, a resin filler, and/or another additive may be added without impairing the effect of the photocurable composition.

Examples of the at least one compound selected from the group consisting of a metal salt and a metal complex include known metalorganic compounds such as cobalt-based, manganese-based, zirconium-based, tin-based, lead-based, zinc-based, copper-based, iron-based, and calcium-based compounds. Examples thereof include iron(3+) octylate, vanadium(4+) acetylacetone, and copper(2+) naphthenate. These metal salts may be used alone or two or more types thereof may be used in combination. When as the component (B), the compound represented by the general formula (2) or (3) is used, a copper-based metalorganic compound is preferably used.

The amount of the at least one compound selected from the group consisting of a metal salt and a metal complex is from 0.0001 parts by weight to 1 part by weight, and preferably from 0.0001 parts by weight to 0.1 parts by weight, per 100 parts by weight of the component (A). When the amount of the at least one compound selected from the group consisting of a metal salt and a metal complex is greater than 1 part by weight, the storage stability of the photocurable composition may be deteriorated.

Examples of the organic peroxide include hydroperoxides such as cumene hydroperoxide, t-butyl hydroperoxide, p-menthane hydroperoxide, methyl ethyl ketone peroxide, cyclohexane peroxide, dicumyl peroxide, and diisopropylbenzene hydroperoxide, ketone peroxides, diallyl peroxides, and peroxy esters.

Examples of the polymerization accelerator include amine compounds, mercaptan compounds, and hydrazine derivatives. Specific examples of the amine compound include aliphatic primary amines such as isopropylamine, butylamine, amylamine, hexylamine, octylamine, and cyclohexylamine; aliphatic secondary amines such as diisopropylamine, dibutylamine diamylamine, dihexylamine, and dioctylamine; aliphatic tertiary amines such as triamylamine, trihexylamine, and trioctylamine; aliphatic unsaturated amines such as triallylamine and oleylamine, aromatic amines such as aniline, laurylaniline, stearylaniline, and triphenylamine; nitrogen-containing heterocyclic compounds such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo[5,4,0]undecene-7 (DBU), 6-(dibutylamino)-1,8-diazabicyclo[5,4,0]undecene-7 (DBA-DBT), 6-(2-hydroxypropyl)-1,8-diazabicyclo[5,4,0]undec-7-ene (OH-DBU), a compound in which a hydroxyl group of OH-DBU is modified by formation of urethane, 1,5-diazabicyclo[4,3,0]nonene-5 (DBN), 1,4-diazabicyclo[2,2,2]octane (DABCO), and aziridine; salts derived from the nitrogen-containing heterocyclic compounds, and other amines including amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylatninopropylamine, 3-diethylaminopropylamine, 3-dibutylaminopropylamine, 3-morpholinopropylamine, 2-(1-piperazinyl)ethylamine, xylylenediamine, and 2,4,6-tris(dimethylaminomethyl)phenol; guanidines such as guanidine, phenylguanidine, and diphenylguanidine; and biguanides such as butylbiguanide, 1-o-tolylbiguanide, and 1-phenylbiguanide. Examples of the mercaptan compound include linear mercaptans such as n-dodecylmercaptan, ethylmercaptan, and butylmercaptan. Examples of the hydrazine derivative include ethylcarbazate, N-aminorhodanine, acetylphenylhydrazine, p-nitrophenylhydrazine, and p-trisulfonylhydrazide.

The ratio of the polymerization accelerator to be blended is from 0 to 5 parts by weight, and preferably from 0.1 to 1 part by weight, per 100 parts by weight of the compound having an unsaturated double bond (A). From the viewpoint of exerting the effect of the polymerization accelerator, the ratio of the polymerization accelerator to be blended is preferably not less than 0.1 parts by weight per 100 parts by weight of the compound having an unsaturated double bond (A). From the viewpoint of securing appropriate storage stability, the ratio of the polymerization accelerator to be blended is preferably not greater than 1 part by weight per 100 parts by weight of the compound having an unsaturated double bond (A).

Examples of the photoinitiator include a photoradical initiator which generates a free radical by irradiation with an active energy ray (in particular, ultraviolet light), a photobase generator which generates a base by irradiation with a radioactive ray, and a photoacid generator which generates an acid by irradiation with a radioactive ray.

Examples of the photoradical initiator include aryl alkyl ketones such as a benzoin ether derivative and an acetophenone derivative, oxime ketones, acylphosphine oxides, S-phenyl thiobenzoate, titanocenes, and derivatives thereof having an increased molecular weight. The photobase generator can be used particularly without limitation as long as it is a compound which generates a base during irradiation with a radioactive ray. As the photoacid generator, an ionic compound or a non-ionic compound may be used, but an ionic compound is preferably used. For example, a compound selected from the group consisting of aromatic diazonium salts such as an aryl diazonium salt, aromatic iodonium salts such as a diaryl iodonium salt, aromatic sulfonium salts such as a triaryl sulfonium salt, and aromatic phosphonium salts such as a triaryl phosphonium salt is preferably used.

To further improve the storage stability of the photocurable composition according to an embodiment of the present invention, a radical absorbent such as benzoquinone, hydroquinone, and hydroquinone monomethyl ether, or a metal chelator such as ethylenediaminetetraacetic acid or 2-sodium salt thereof, oxalic acid, acetylacetone, and o-aminophenol may be added.

Examples of the physical properties-adjusting agent include an elastomer which is a polymeric compound having rubber-like elasticity at normal temperature. This elastomer can be added to improve the tensile strength. Examples of the elastomer include various types of synthetic rubbers such as an acrylonitrile-butadiene-methacrylic acid copolymer, an acrylonitrile-butadiene-methyl methacrylate copolymer, a methyl methacrylate-butadiene-styrene copolymer (MBS), an acrylonitrile-styrene-butadiene copolymer, acrylonitrile-butadiene rubber, linear polyurethane, styrene-butadiene rubber, chloroprene rubber, and butadiene rubber, natural rubber, styrene-based thermoplastic elastomers such as styrene-polybutadiene-styrene synthetic rubber, olefinic thermoplastic elastomers such as polyethylene-EPDM synthetic rubber, caprolactone-type, adipate-type, and PTMG-type urethane-based thermoplastic elastomers, polyester-based thermoplastic elastomers such as a polybutylene terephthalate-polytetramethylene glycol multiblock polymer, polyamide-based thermoplastic elastomers such as a nylon-polyol block copolymer and a nylon-polyester block copolymer, a 1,2-polybutadiene-based thermoplastic elastomer, and a vinyl chloride-based thermoplastic elastomer. The elastomers may be used alone or two or more types thereof may be used in combination within such a range that the compatibility is observed.

Method for Producing Photocurable Composition

A method for producing the photocurable composition according to an embodiment of the present invention is not particularly limited. For example, the components (A), (B), and (C) are blended in predetermined amounts, another blending material is blended, as necessary. The mixture is then degassed and stirred. As a result, the photocurable composition can be produced. The order of blending the components and the other blending material is not particularly limited, and can be appropriately determined.

The photocurable composition according to an embodiment of the present invention may be a one-part composition or a two-part composition, as necessary. In particular, a one-part photocurable composition can be suitably used. The photocurable composition according to an embodiment of the present invention is a photocurable composition in which curing is promoted by light irradiation. The photocurable composition according to an embodiment of the present invention is curable at normal temperature (e.g., 23° C.), and is suitably used as a normal-temperature photocurable composition. As necessary, the photocurable composition may be heated as appropriate to promote curing.

A cured product of the photocurable composition can be obtained by curing the photocurable composition according to an embodiment of the present invention. Examples of a product including the cured product obtained by curing the photocurable composition include products in various fields, such as an electronic circuit, an electronic component, a building material, and an automobile.

A condition of irradiation of the photocurable composition according to an embodiment of the present invention with light is not particularly limited. In a case of irradiation with an active energy ray during curing, as the active energy ray, light rays such as ultraviolet light, visible light, and infrared light, electromagnetic wave such as X-rays and γ-rays, an electron beam, a proton beam, or a neutral beam can be used. Curing by irradiation with ultraviolet light or an electron beam is preferable, and curing by irradiation with ultraviolet light is more preferable in terms of a curing rate, availability and price of an irradiation device, and easy handling under sun light or general illumination. Ultraviolet light includes a g-beam (wavelength: 436 nm), a h-beam (wavelength: 405 nm), and an i-beam (wavelength: 365 nm). Examples of an active energy ray source include a high-pressure mercury lamp, a low-pressure mercury lamp, an electron beam irradiation device, a halogen lamp, a light-emitting diode, a semiconductor laser, and a metal halide.

In a case of ultraviolet light, for example, the irradiation energy is preferably from 10 to 20000 $mJ/cm^2$, more preferably from 20 to 10000 $mJ/cm^2$, and further preferably from 50 to 5000 $mJ/cm^2$. From the viewpoint of sufficiently securing curing properties, the irradiation energy is preferably not less than 10 $mJ/cm^2$. From the viewpoint of reducing the irradiation time and cost, the irradiation energy is preferably not greater than 20000 $mJ/cm^2$.

A method for applying the photocurable composition according to an embodiment of the present invention to an adherend is not particularly limited. As the method, a coating method such as screen printing, stencil printing, roll printing, dispenser coating, and spin coating is suitably used.

Timing of applying the photocurable composition to the adherend and light irradiation is not limited. For example, the photocurable composition is irradiated with light, and the adherend is then applied. Thus, the product can be produced. When the photocurable composition is applied to the adherend and is irradiated with light, the photocurable composition is cured. Thus, the product can be produced.
Production of Product The product according to an embodiment of the present invention includes the cured product obtained by curing the photocurable composition described above. The photocurable composition according to an embodiment of the present invention is prepared (composition preparation step). That is, the predetermined amounts of the components (A), (B), and (C) and/or the other additives are weighed, and mixed to prepare the photocurable composition.

Next, the prepared photocurable composition is applied to a predetermined area of an adherend (application step). To a surface of the adherend, the photocurable composition is applied by a procedure such as printing. The photocurable composition applied to the adherend is irradiated with light (irradiation step). Immediately after at least light irradiation, the photocurable composition maintains a state, in which the photocurable composition is capable of adhesion to the adherend. Next, the adherend to which the photocurable composition is applied is bonded to another adherend so that the area where the photocurable composition is applied is placed between the adherends (adhesion step). As a result, the cured product according to an embodiment of the present invention is formed. The shape of the cured product may be a thin film shape or a plate shape (sheet shape) which is thicker than a thin film. After the curing step, the cured product obtained by curing is allowed to stand under a predetermined atmosphere. Thus, curing may be promoted strongly. For example, when the photocurable composition according to an embodiment of the present invention is used in bonding a member to another member, the product including the cured product obtained by curing the photocurable composition according to an embodiment of the present invention is produced.

Effects of Embodiment

In the photocurable composition according to this embodiment, the component (A) is used in combination with the specific components (B) and (C). Thus, not only a composition which can maintain a state, in which the photocurable composition is capable of adhesion to the adherend after light irradiation and can be used in bonding an opaque material which is cured under an anaerobic condition can be realized, but also a composition having excellent storage stability can be realized.

When the photocurable composition according to the embodiment is under an anaerobic condition after light irradiation, curing is promoted. Thus, it is not necessary to continue light irradiation in the curing step. According to the photocurable composition according to the embodiment, workability in adhesion and the like can be largely improved.

EXAMPLE

Hereinafter, the photocurable composition according to an embodiment of the present invention will be described in detail by using Examples.

Example 1

Blending materials were mixed and stirred at the blending ratio shown in Table 1, to prepare a photocurable composition in Example 1. The amount of each of the blending materials in Table 1 is represented in "g". Details of the blending materials are as follows.

(Component A: A1) isobornyl acrylate (IBXA, available from Osaka Organic Chemical Industry Ltd.)

(Component A: A2) 4-hydroxybutyl acrylate (4HBA, available from Osaka Organic Chemical Industry Ltd.)

(Component B: B1) diphenylethanedione (benzyl, available from Tokyo Chemical Industry Co., Ltd.)

(Component B: B2) 1,7,7-trimethylbicyclo[2.2.1]heptane-2,3-dione camphorquinone, available from Wako Pure Chemical Industries, Ltd.)

(Component B: B3) 2,3-butanedione (diacetyl, available from Tokyo Chemical Industry Co., Ltd.)

(Component B: B4) 3-methyl-2-hydroxy-2-cyclopenten-1-one (cyclotene, available from Tokyo Chemical Industry Co., Ltd.)

(Component B: B5) ascorbyl palmitate (available from Tokyo Chemical Industry Co., Ltd.)

(Component B': B'1) 3-hydroxy-2-butanone (acetoin, available from Tokyo Chemical Industry Co., Ltd.)

(Component B': B'2) 2,3-dihydroxybutane (available from Tokyo Chemical Industry Co., Ltd.)

(Component B': B'3) ethyl p-dimethylaminobenzoate (available from Tokyo Chemical Industry Co., Ltd.)
(Component B': B'4) cumene hydroperoxide (trade name PERCUMYL H-80, NOF Corporation)
(Component C: C1) 2,4-diethylthioxanthone (trade name KAYACURE DETX-S, available from NIPPON KAYAKU Co., Ltd.)
(Component C: C2) benzophenone (available from Tokyo Chemical Industry Co., Ltd.)
(Curing accelerator) o-benzoic sulfimide (saccharin)

mW/cm$^2$), integrated light amount: 2000 mJ/cm$^2$). After irradiation with UV, the second adherend degreased was bonded to the first adherend within 1 minute so that the photocurable composition irradiated with UV was placed between the first and second adherends. As a result, a specimen was prepared. Next, this specimen was aged in an environment of 23° C. and 50% RH, and after a predetermined time was elapsed, the specimen was pushed by the finger. At that time, whether the other adherend was shifted against the adherend was evaluated.

TABLE 1

| Blending material | | | Example | | | | | | |
|---|---|---|---|---|---|---|---|---|---|
| Component | | Compound name | 1 | 2 | 3 | 4 | 5 | 6 | 7 |
| Component A | A1 | IBXA | 50 | 50 | 50 | 50 | 50 | 50 | 50 |
| | A2 | 4HBA | 50 | 50 | 50 | 50 | 50 | 50 | 50 |
| Component B | B1 | Benzyl | 1.1 | 1.1 | 1.1 | — | — | — | — |
| | B2 | Camphorquinone | — | — | — | 0.8 | — | — | — |
| | B3 | Diacetyl | — | — | — | — | 0.4 | — | — |
| | B4 | Cyclotene | — | — | — | — | — | 0.6 | — |
| | B5 | Ascorbyl palmitate | — | — | — | — | — | — | 1 |
| Other than Component B | B'1 | Acetoin | — | — | — | — | — | — | — |
| | B'2 | 2,3-dihydroxybutane | — | — | — | — | — | — | — |
| | B'3 | Ethyl p-dimethylaminobenzoate | — | — | — | — | — | — | — |
| | B'4 | Cumene hydroperoxide | — | — | — | — | — | — | — |
| Component C | C1 | 2,4-diethylthioxanthone | 0.5 | 0.5 | — | 0.5 | 0.5 | 0.5 | 0.5 |
| | C2 | Benzophenone | — | — | 0.4 | — | — | — | — |
| Curing accelerator | | Saccharin | 0.4 | — | 0.4 | 0.4 | 0.4 | 0.4 | 0.4 |
| Evaluation | | Condition of irradiation with UV | 1 | 1 | 2 | 1 | 1 | 1 | 1 |
| | | SPCC × SPCC fixation | Excellent | Good | Excellent | Excellent | Excellent | Excellent | Excellent |
| | | Storage stability | Good | Good | Good | Good | Good | Good | Good |

| Blending material | | | Comparative Example | | | | | |
|---|---|---|---|---|---|---|---|---|
| Component | | Compound name | 1 | 2 | 3 | 4 | 5 | 6 |
| Component A | A1 | IBXA | 50 | 50 | 50 | 50 | 50 | 50 |
| | A2 | 4HBA | 50 | 50 | 50 | 50 | 50 | 50 |
| Component B | B1 | Benzyl | 1.1 | — | — | — | — | 1.1 |
| | B2 | Camphorquinone | — | — | — | — | — | — |
| | B3 | Diacetyl | — | — | — | — | — | — |
| | B4 | Cyclotene | — | — | — | — | — | — |
| | B5 | Ascorbyl palmitate | — | — | — | — | — | — |
| Other than Component B | B'1 | Acetoin | — | 0.5 | — | — | — | — |
| | B'2 | 2,3-dihydroxybutane | — | — | 0.5 | — | — | — |
| | B'3 | Ethyl p-dimethylaminobenzoate | — | — | — | 0.5 | — | — |
| | B'4 | Cumene hydroperoxide | — | — | — | — | 1 | — |
| Component C | C1 | 2,4-diethylthioxanthone | — | 0.5 | 0.5 | 0.5 | 0.5 | — |
| | C2 | Benzophenone | — | — | — | — | — | — |
| Curing accelerator | | Saccharin | 0.4 | 0.4 | 0.4 | 0.4 | 0.4 | 0.4 |
| Evaluation | | Condition of irradiation with UV | 1 | 1 | 1 | 1 | 1 | — |
| | | SPCC × SPCC fixation | Poor | Poor | Poor | Not adhered | Poor | Good |
| | | Storage stability | Good | Good | Good | Good | Good | Poor |

SPCC Fixation Test

Two cold rolled steel plates (SPCC) were prepared as first and second adherends, and a surface of each of the first and second adherends was degreased by using acetone. To the degreased surface of the first adherend, the photocurable composition in Example 1 was uniformly applied so that the thickness was about 1 mm. Subsequently, the photocurable composition in Example 1 applied to the first adherend was irradiated with ultraviolet light (UV) (irradiation condition UV-LED lamp (wavelength: 365 nm, illuminance: 1000

Evaluation criteria of a fixation test are as follows.
"Excellent": After 1 hour, the adherend did not shift (cured).
"Good": After 1 hour, the adherend shifted. After 24 hours, the adherend did not shift (cured).
"Poor": Even after 24 hours, the adherend shifted (not cured).

In a case where bonding failed, the photocurable composition was cured immediately after irradiation with UV, and the second adherend was not bonded to the first adherend.

Storage Stability Test 10 g of the photocurable composition in Example 1 was placed in a glass bottle and the glass bottle was hermetically sealed. The glass bottle was allowed to stand in an environment of 80° C. and the change in the content was then evaluated. Evaluation criteria of a storage stability test are as follows.

"Good": After 12 hours, the content did not change.
"Poor": After 12 hours, the viscosity of the content significantly increased or gelation was observed.

Examples 2 to 7 and Comparative Examples 1 to 6

A photocurable composition was obtained in the same manner as in Example 1 except that a blending material was changed as shown in Table 1, and the properties of the obtained photocurable composition were evaluated in the same manner as in Example 1. The results are shown in Table 1. In Example 3, a condition of irradiation with UV is as follows.

Irradiation condition 2: metal halide lamp equipped with cold filter, illuminance: 140 mW/cm$^2$, integrated light amount: 400 mJ/cm$^2$ As can be seen from Table 1, all the photocurable compositions in Examples exhibited excellent fixation, where the compositions were rapidly cured by placing the compositions between metal adherends after irradiation with UV. All the photocurable compositions in Examples did not change over at least 12 hours even at a higher temperature of 80° C. This shows excellent storage stability. Comparative Example 6, in which cumene hydroperoxide, which is generally used for an anaerobic adhesive agent, was contained, results in poor storage stability, though there was no need for light irradiation. These results show that the photocurable compositions in Examples can be used in bonding opaque materials and had very excellent storage stability.

Example 8

Blending materials were mixed and stirred at the blending ratio shown in Table 2, to prepare a photocurable composition in Example 8. The amount of each of the blending materials in Table 2 is represented in "g". Details of the blending materials are as follows.

(Component A: A1) isobornyl acrylate (IBXA, available from Osaka Organic Chemical Industry Ltd.)

(Component A: A2) 4-hydroxybutyl acrylate (4HBA, available from Osaka Organic Chemical industry Ltd.)

(Component A: A3) 2-hydroxyethyl methacrylate (HEMA)

(Component B: B1) diphenylethanedione (benzyl, available from Tokyo Chemical Industry Co., Ltd.)

(Component B: B2) 1,7,7-trimethylbicyclo[2.2.1]heptane-2,3-dione camphorquinone, available from Wako Pure Chemical Industries, Ltd.)

(Component B: B3) 2,3-butanedione (diacetyl, available from Tokyo Chemical industry Co., Ltd.)

(Component B: B4) 3-methyl-2-hydroxy-2-cyclopenten-1-one (cyclotene, available from Tokyo Chemical Industry Co., Ltd.)

(Component B: B5) ascorbyl palmitate (available from Tokyo Chemical Industry Co., Ltd.)

(Component C) 2,4-diethylthioxanthone (trade name KAYACURE DETX-S, available from NIPPON KAYAKU Co., Ltd.)

(Component D: D1) iron(3+) octylate (trade name NIKKA OCTHIX iron, available from Nihon Kagaku Sangyo Co., Ltd.)

(Component D: D2) vanadium(4+) acetylacetone (trade name NACEM vanadium, available from Nihon Kagaku Sangyo Co., Ltd.)

(Component D: D3) copper(2+) naphthenate (trade name Nafutekkusu copper, available from Nihon Kagaku Sangyo Co., Ltd.)

(Component D: D4) ferrocene (available from Tokyo Chemical Industry Co., Ltd.)

(Curing accelerator) o-benzoic sulfimide (saccharin)

(Polymerization accelerator) octylamine (n-octylamine) (available from Tokyo Chemical Industry Co., Ltd.)

(Polymerization accelerator) benzothiazole (available from Tokyo Chemical Industry Co., Ltd.)

TABLE 2

| Blending material | | | Examples | | | | |
| --- | --- | --- | --- | --- | --- | --- | --- |
| Component | | Compound name | 8 | 9 | 10 | 11 | 12 |
| Component A | A1 | IBXA | 50 | 50 | 50 | 50 | 50 |
| | A2 | 4HBA | 50 | 50 | 50 | 50 | 50 |
| | A3 | HEMA | — | — | — | — | — |
| Component B | B1 | Benryl | 1.1 | — | — | 2.1 | 2.1 |
| | B2 | Camphorquinone | — | 0.8 | — | — | — |
| | B3 | Diacetyl | — | — | 0.4 | — | — |
| | B4 | Cyclotene | — | — | — | — | — |
| | B5 | Ascorbyl palmitate | — | — | — | — | — |
| Component C | | 2,4-diethylthioxanthone | 0.5 | 0.5 | 0.5 | 0.5 | 0.5 |
| Component D | D1 | Fe(3+) octylate | 0.1 | 0.1 | 0.1 | 0.1 | — |
| | D2 | V(4+) acetylacetone | — | — | — | — | 0.1 |
| | D3 | Cu(2+) naphthenate | — | — | — | — | — |
| | D4 | Ferrocene | — | — | — | — | — |
| Curing accelerator | | Saccharin | 0.4 | 0.4 | 0.4 | 0.4 | 0.4 |
| Polymerization accelerator | | Octylamine | — | — | — | — | — |
| | | Benzothiazole | — | — | — | — | — |
| Evaluation | | Condition of irradiation with UV | 1 | 1 | 1 | 1 | 1 |
| | | PVC × PVC fixation | Excellent | Good | Good | Excellent | Excellent |
| | | Storage stability | Good | Good | Good | Good | Good |

TABLE 2-continued

| Blending material | | | Examples | | | | | Reference Example |
|---|---|---|---|---|---|---|---|---|
| Component | | Compound name | 13 | 14 | 15 | 16 | 17 | 1 |
| Component A | A1 | IBXA | 50 | 50 | 50 | 50 | 50 | — |
| | A2 | 4HBA | 50 | 50 | 50 | 50 | 50 | — |
| | A3 | HEMA | — | — | — | — | — | 100 |
| Component B | B1 | Benzyl | 2.1 | 1.1 | 1.1 | — | — | — |
| | B2 | Camphorquinone | — | — | — | — | — | — |
| | B3 | Diacetyl | — | — | — | — | — | — |
| | B4 | Cyclotene | — | — | — | 0.6 | — | — |
| | B5 | Ascorbyl palmitate | — | — | — | — | 1 | — |
| Componen C | | 2,4-diethylthioxanthone | 0.5 | 0.5 | 0.5 | 0.5 | 0.5 | — |
| Component D | D1 | Fe(3+) octylate | — | 0.1 | — | — | — | — |
| | D2 | V(4+) acetylacetone | — | — | — | — | — | — |
| | D3 | Cu(2+) naphthenate | 0.1 | — | 0.1 | 0.1 | 0.1 | — |
| | D4 | Ferrocene | — | — | — | — | — | 0.1 |
| Curing accelerator | | Saccharin | 0.4 | — | 0.4 | 0.4 | 0.4 | 2 |
| Polymerization accelerator | | Octylamine | — | — | 0.3 | 0.3 | 0.3 | — |
| | | Benzothiazole | — | — | — | — | — | 0.5 |
| Evaluation | | Condition of irradiaton with UV | 1 | 1 | 1 | 1 | 1 | 2 |
| | | PVC × PVC fixation | Good | Good | Excellent | Good | Good | Poor |
| | | Storage stability | Good | Good | Good | Good | Good | Good |

PVC×PVC Fixation Test

Two polyvinyl chloride (PVC) plates were prepared as first and second adherends that were an opaque material, and a surface of each of the first and second adherends was degreased by using isopropyl alcohol. To the degreased surface of the first adherend, the photocurable composition in Example 8 was uniformly applied so that the thickness was about 1 mm. Subsequently, the photocurable composition in Example 8 applied to the first adherend was irradiated with ultraviolet light (UV) (irradiation condition 1: UV-LED lamp (wavelength: 365 nm, illuminance: 1000 mw/cm$^2$), integrated light amount: 2000 mJ/cm$^2$). After irradiation with UV, the second adherend degreased was bonded to the first adherend within 1 minute so that the photocurable composition irradiated with UV was placed between the first and second adherends. As a result, a specimen was prepared. Next, this specimen was aged in an environment of 23° C., and 50% RH, and after a predetermined time was elapsed, the specimen was pushed by the finger. At that time, whether the other adherend was shifted against the adherend was evaluated.

Evaluation criteria of a fixation test are as follows.

"Excellent": After 1 hour, the adherend did not shift (cured).

"Good": After 1 hour, the adherend shifted. After 24 hours, the adherend did not shift (cured).

"Poor": Even after 24 hours, the adherend shifted (not cured).

Storage Stability Test 10 g of the photocurable composition in Example 8 was placed in a light-shielded container and the container was hermetically sealed. The light-shielded container was allowed to stand in an environment of 23° C. until the next day (specifically, for 12 hours), and the appearance of the content was observed. Evaluation criteria of a storage stability test are as follows.

"Good": The content did not change from immediately after preparation of the photocurable composition.

"Poor": The content significantly discolored or gelation in the light-shielded container was observed.

Examples 8 to 17 and Reference Example

A photocurable composition was obtained in the same manner as in Example 8 except that a blending material was changed as shown in Table 2, and the properties of the obtained photocurable composition were evaluated in the same manner as in Example 8. The results are shown in Table 2. In Reference Example, a condition of irradiation with UV is as follows.

Irradiation condition 2: metal halide lamp equipped with cold cut filter, illuminance: 330 mW/cm$^2$, integrated light amount: 1100 mJ/cm$^2$, number of irradiation: 3

As can be seen from Table 2, all the photocurable compositions in Examples exhibited excellent fixation, where the compositions were rapidly cured by placing the compositions between adherends after irradiation with UV. Although all the photocurable compositions in Examples contained a metal salt or a metal complex, all the photocurable compositions in Examples did not change over a long period of time even from immediately after preparation. This shows excellent storage stability. The curable composition in Reference Example had excellent storage stability, but showed a poor result in fixation as "poor". That is, it is found that for the photocurable compositions in Examples, the curing rate was high and the storage stability was very excellent.

The embodiments of the present invention and Examples are described above. However, the present invention according to the scape of claims is not limited to the embodiments and Examples described above. It should be noted that all combinations of characteristics described in the embodiments and Examples are not necessarily essential for the solution for solving the problems of the present invention and various modifications can be made without departing from the spirit of the present invention.

The invention claimed is:

1. A photocurable composition comprising:
    (A) a compound having an unsaturated double bond;
    (B) at least one compound selected from the group consisting of compounds represented by general formulae (1), (2), and (3);

(C) a sensitizer; and
(D) at least one metalorganic compound,

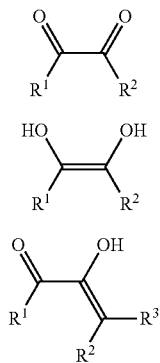

(1)

(2)

(3)

where $R^1$ to $R^3$ are each independently a substituent containing at least one group selected from the group consisting of a nitro group, a cyano group, a hydroxy group, an acetyl group, a carbonyl group, a substituted or unsubstituted allyl group, a substituted or unsubstituted alkyl group, a substituted or unsubstituted alkoxy group, an unsubstituted or substituted aryl group, an unsubstituted or substituted aryloxy group, a heterocyclic ring structure-containing group, and a group having a plurality of rings; provided that at least two groups selected from the group consisting of $R^1$ to $R^3$ are optionally bonded to each other to form a cyclic structure with carbon atoms to which the groups are bonded.

2. The photocurable composition according to claim 1, wherein the sensitizer (C) is at least one compound selected from the group consisting of a derivative of an aromatic compound, a carbazole derivative, an aromatic carbonyl compound, a benzophenone derivative, a thioxanthone derivative, and a coumarin derivative.

3. The photocurable composition according to claim 1, wherein the photocurable composition maintains a state, in which the photocurable composition is capable of adhesion to an adherend, at least immediately after irradiation with active energy.

4. A product comprising a cured product obtained by curing the photocurable composition according to claim 1.

* * * * *